United States Patent
Sismanoglu et al.

(10) Patent No.: US 9,364,929 B1
(45) Date of Patent: Jun. 14, 2016

(54) SPECIFIED ENGINE VALVE REMOVAL TOOL

(71) Applicants: Hamza Sismanoglu, Kenvil, NJ (US); Erkan Borluca, Kenvil, NJ (US)

(72) Inventors: Hamza Sismanoglu, Kenvil, NJ (US); Erkan Borluca, Kenvil, NJ (US)

( * ) Notice: Subject to any disclaimer, the term of this patent is extended or adjusted under 35 U.S.C. 154(b) by 239 days.

(21) Appl. No.: 14/072,363

(22) Filed: Nov. 5, 2013

Related U.S. Application Data

(60) Provisional application No. 61/833,564, filed on Jun. 11, 2013.

(51) Int. Cl.
*B23P 19/04* (2006.01)

(52) U.S. Cl.
CPC .................... *B23P 19/048* (2013.01)

(58) Field of Classification Search
CPC .. B25B 27/26; B25B 27/24; Y10T 29/49314; Y10T 29/53961; Y10T 29/53561; Y10T 29/53843
See application file for complete search history.

(56) References Cited

U.S. PATENT DOCUMENTS

| | | | |
|---|---|---|---|
| 3,315,339 A | 4/1967 | Young | |
| 4,229,999 A | 10/1980 | Rottigni | |
| 4,667,388 A | 5/1987 | Browning | |
| 4,912,825 A | 4/1990 | Policella | |
| 5,022,632 A * | 6/1991 | Beideck | 254/30 |
| 6,345,436 B1 | 2/2002 | Codrington | |
| 7,104,161 B2 | 9/2006 | De Waal | |
| 7,587,799 B2 * | 9/2009 | Li | 29/240.5 |
| 2007/0114501 A1 * | 5/2007 | Eby et al. | 254/25 |
| 2012/0234140 A1 | 9/2012 | Flamion | |

* cited by examiner

*Primary Examiner* — Monica Carter
*Assistant Examiner* — Nirvana Deonauth
(74) *Attorney, Agent, or Firm* — Robert C. Montgomery; Montgomery Patent & Design, LP

(57) ABSTRACT

An engine valve spring compression tool to assist in removing and replacing valve stem seals without removing a cylinder head from the engine. The tool having exhaust and intake valve connecting stems that provide fulcrum points, a compression bushing assembly to compress the valve spring, and a hook assembly to lock the tool in compression to allow the ancillary work to be completed.

16 Claims, 4 Drawing Sheets

SPECIFIED ENGINE VALVE REMOVAL TOOL

RELATED APPLICATIONS

The present invention was first described in and claims the benefit of U.S. Provisional Application No. 61/833,564, filed Jun. 11, 2013, the entire disclosures of which are incorporated herein by reference.

FIELD OF THE INVENTION

The present invention relates generally to an engine valve spring compression tool assisting in removing and replacing valve stem seals without removing a cylinder head.

BACKGROUND OF THE INVENTION

There has been a long standing need to have a specific tool for removing and replacing valve stem seals when the cylinder head is still on the engine, especially when the engine is still within the vehicle. With the proper tool, a user can compress the valve springs to remove them and replace the valve stem seals quickly and easily without removing the cylinder head.

SUMMARY OF THE INVENTION

The disadvantages of the prior art are overcome by the present invention in providing a valve spring compression tool comprising a compressor bushing assembly, a handle assembly, and exhaust and intake connector stems. The handle assembly includes a handle, a handle pivot bushing having a handle pivot bushing aperture, and a compressor bushing assembly pivot. Both the exhaust valve connector stem and the intake valve connector stem having a post pivots which are used to connect to the cylinder head by bolts exposed during the maintenance operation. The stems include support bars that provide fulcrum points for the handle pivot bushing aperture of the handle assembly. The cylinder in question has its spark plug removed, put at top dead center, and is pressurized to retain the valves in the closed position. Then the compression bushing assembly of the tool engages the top of the valve assembly to be compressed and the handle is depressed by the user to compress the valve spring. A hook assembly can then be engaged to lock the compressor tool in compression.

Thus, when the present invention is used maintenance time is greatly reduced by foregoing the usual requirement of cylinder head removal and the time-consuming sub-assembly removal just to get to that point in the maintenance operation.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
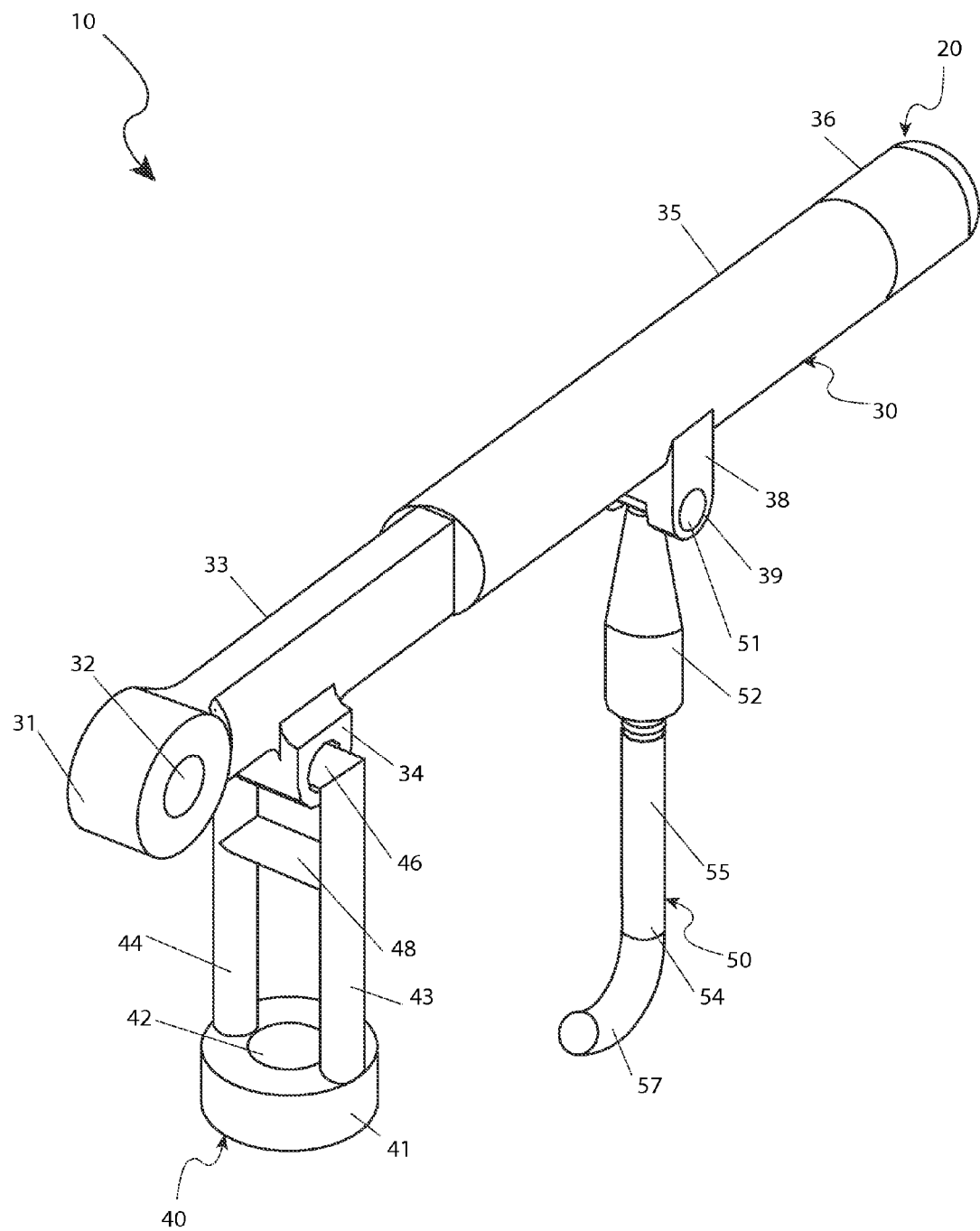
FIG. 1 is an isometric view of a compressor 20 of the valve spring compression tool 10 in accordance with the preferred embodiment of the present invention.

10 valve spring compression tool
20 compressor
30 handle assembly
31 handle pivot bushing
32 handle pivot bushing aperture
33 neck
34 compressor bushing assembly pivot
35 grip
36 grip extension
37 thread
38 hook pivot clevis
39 hook pivot clevis aperture
40 compressor bushing assembly
41 bushing
42 bushing aperture
43 first compression column
44 second compression column
46 support beam
48 hook beam
50 hook assembly
51 hook pivot
52 receiver
54 lock
55 shank
57 bend
60 exhaust valve connector stem
61 exhaust post pivot
62 exhaust post flat
63 exhaust post channel
65 exhaust support bar
66 fulcrum A
67 fulcrum B
68 exhaust stem spacer
70 intake valve connector stem
71 intake post pivot
72 intake post channel
75 intake support bar
76 fulcrum C
77 fulcrum D
78 intake stem spacer

DETAILED DESCRIPTION OF THE PREFERRED EMBODIMENT

Figure 3:
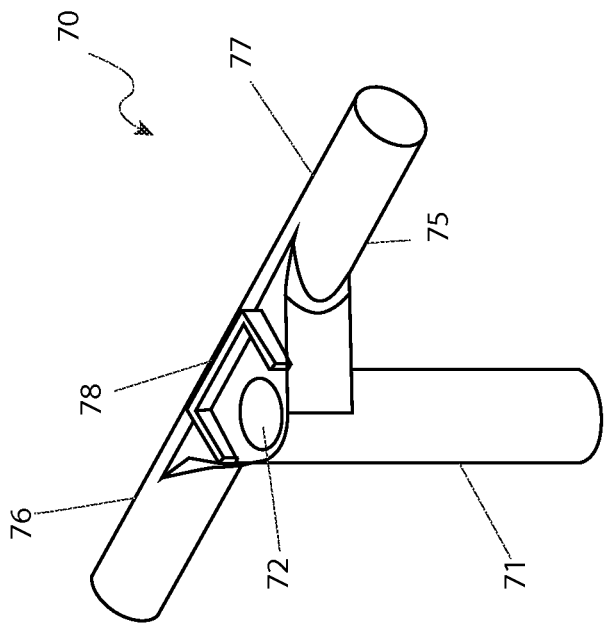
FIG. 3 is an isometric view of an inverted intake valve connector stem 70 of the valve spring compression tool 10 in accordance with the preferred embodiment of the present invention.
Figure 4:
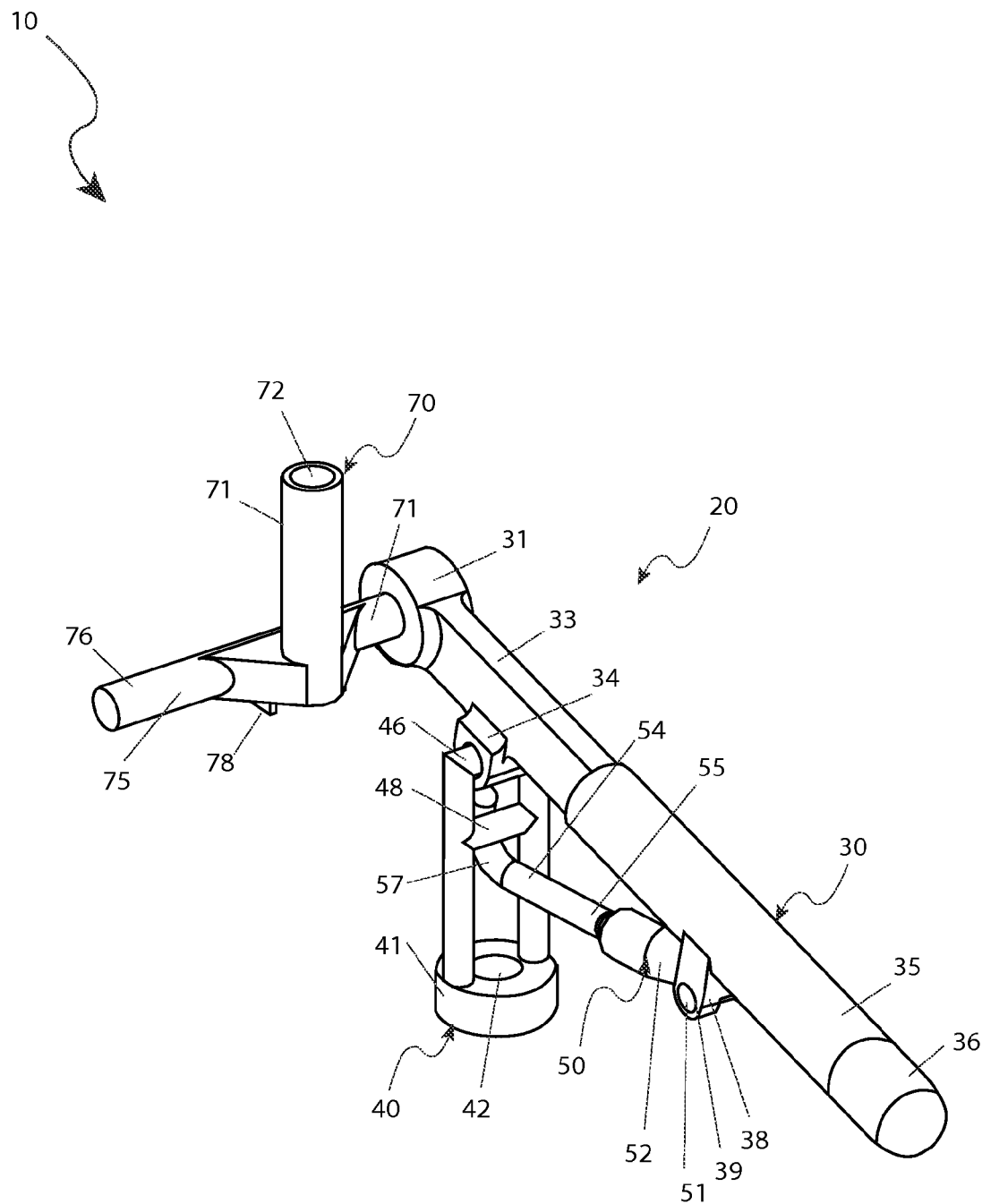
FIG. 4 is an isometric view of the valve spring compression tool 10 depicted with a hook assembly 50 engaged in a hook beam 48 in accordance with the preferred embodiment of the present invention; and, FIG. 5 is an isometric view of the compressor 20 showing the grip extension 36 separated from the grip 35 of the valve spring compression tool 10 in accordance with the preferred embodiment of the present invention.
Figure 5:
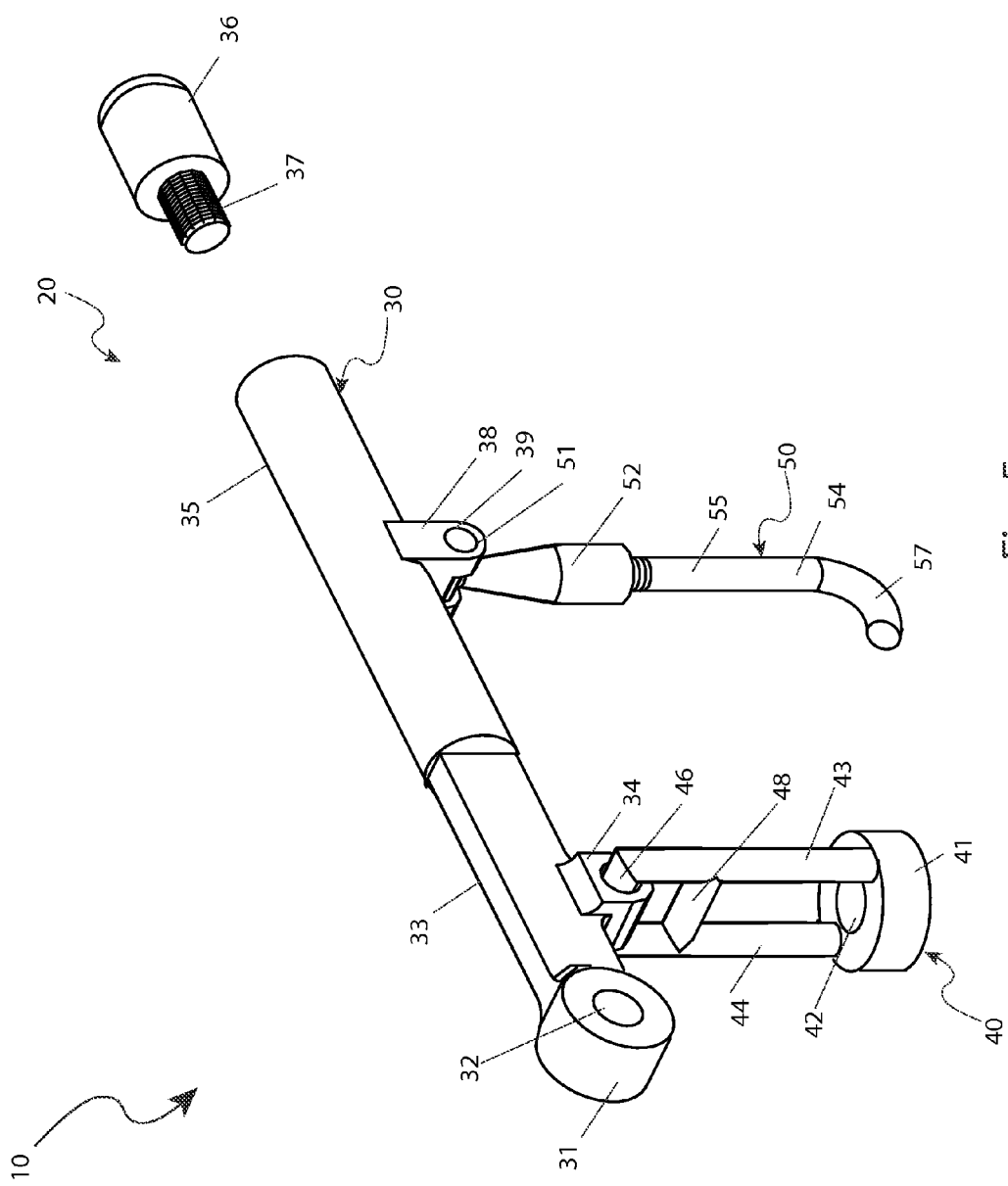

The best mode for carrying out the invention is presented in terms of its preferred embodiment, herein depicted within FIGS. 1 through 4, and an alternate embodiment, herein depicted within FIGS. 5 and 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a valve spring compression tool (herein referred to as the "apparatus") 10, which provides a means and procedure to compress an intake or an exhaust valve spring of an internal combustion engine so that the valve spring keepers and eventually the valve spring can be removed for the ultimate replacement of a valve stem seal, without removing the cylinder head in which the valve is installed.

The apparatus 10 is comprised of a compressor 20, an exhaust valve connector stem 60, and an intake valve connector stem 70. These three (3) assemblies are depicted separately in FIGS. 1, 2, and 3. The constituent material of the apparatus 10 is preferably a quality grade of medium carbon steel. However, other grades of steel, or stainless steel, or some other metals, could be substituted without limiting the scope of the invention.

Referring now to FIG. 1, an isometric view of the compressor 20 of the apparatus 10, according to the preferred embodiment of the present invention, is disclosed. The compressor 20 is comprised of a handle assembly 30, a compressor bushing assembly 40, and a hook assembly 50. The compressor 20 operates as a class two lever having a handle generally attached to an end pivot point working on a load (i.e., the valve spring) in the middle of the lever. More specifically, depressing the handle assembly 30 pivots the compressor 20 about the handle pivot bushing 31 and uses the compressor bushing assembly 40 to compress one of the valve spring of the engine. The hook assembly 50 is provided to lock the handle assembly down to hold the valve spring in compression while other ancillary work is done.

The handle assembly 30 is comprised preferably of a rectangular neck 33 attached to, or formed with, the first end of a generally cylindrical grip 35. A second end of the grip 35 is provided with a threaded aperture for the insertion of a grip extension 36. The grip extension 36 as seen in FIG. 5 is an approximately one inch (1 in.) long cylinder having a thread 37 at a first end and a hemispherical terminus at the opposite end. In some applications the available space in the work area in which the apparatus 10 is used is so limited that only the foreshortened length of the grip 35 can be accommodated. In other applications where more space is available, additional leverage can be gained by the use of the grip extension 36 in combination with the grip 35.

The handle pivot bushing 31 includes a handle pivot bushing aperture 32 that is sized to accommodate the diameter of support bar 65 located on the exhaust valve connector stem 60 and support bar 75 located on the intake valve connector stem 70. Disposed upon the neck 33 of the handle assembly 30 is a compressor bushing assembly pivot 34 that extends downwardly from the neck 33 and includes a through aperture, which is sized to accommodate the diameter of a support beam 46 of the compressor bushing assembly 40.

Disposed upon the grip 35 is a hook pivot clevis 38 that extends downwardly from the grip 35 and includes a pair of conjoined truncated ovals with aligned apertures appropriately sized to accommodate a hook pivot 51 of the hook assembly 50. The exact geometry of the handle assembly 40 has some variability but should at all times be determined by the small amount of space in which the apparatus 10 will be used. The attachments of the handle pivot bushing 31, the compressor bushing assembly pivot 34, and the hook pivot clevis 38 to the handle assembly 30 are made preferably by welding; however, the handle assembly 30 could be cast or forged and further machined to present the necessary features. The central axes of handle pivot bushing 31, the compressor bushing assembly pivot 34, and the hook pivot clevis aperture 39 are all in parallel alignment and further aligned perpendicularly with the longitudinal axis of the neck 33 and the grip 35.

A bushing 41 of the compression bushing assembly 40 is comprised of a disk, which is that portion of the apparatus 10 that contacts the valve spring washer, with a bushing aperture 42. The bushing aperture 42 is tapered, with a smaller diameter on the distal side. The purpose of this taper in the bushing aperture 42 is to assist in directing the valve spring keepers, which themselves are provided with a tapered profile, toward a seat in the valve stem groove during reassembly of the mechanism. The compression bushing assembly 40 includes a pair of vertical supports, namely a first compression column 43 and a second compression column 44, and a support beam 46 connected between upper ends of the vertical supports. The hook beam 48 is attached to each of the first compression column 43 and the second compression column 44 at an intermediate location. The support beam 46 must of necessity be cylindrical to be accommodated in the aperture of the bushing pivot. Because of the limited space in which the apparatus 10 is required to be operated, a conventional pinned joint construction cannot be used in this design. Instead, the preferred method of fabrication of the compression bushing assembly 40 is to attach the first compression column 43 to the bushing 41, on that side of said bushing 41 of which the bushing aperture 42 has the largest diameter; attach the support beam 46 and the hook beam 48 to the first compression column 42; install the support beam 46 into the aperture of the bushing pivot 34 of the handle assembly 30 such that all of the compression bushing assembly 40 is on one (1) side of the neck 33; and attach the second compression column 44 to the bushing 41, the hook beam 48, and the support beam 46. The joining ends of the first compression column 43, the second compression column 42, and the support beam 46 may be mitered to improve the fit and final appearance.

The receiver 52 of the hook assembly 50 is preferably cylindrical with a tapered portion to reduce the diameter from that required to accommodate the shank 55 to a diameter appropriate to weld to the hook pivot 51. The straight portion of the receiver 52 is provided with an internal thread (not shown) for the threaded insertion of the shank 55. The hook pivot 51 is a cylindrical piece sized to fit into the hook pivot clevis aperture 39 of the hook pivot clevis 38 on the handle assembly 30. Again, due to the limited space in which the apparatus 10 is required to be operated, a conventional pinned joint connection cannot be used at the hook pivot 51. The preferred method of fabrication of this pivot joint is to install the hook pivot 51 into the hook pivot clevis aperture 39 of the hook pivot clevis 38 and weld the tapered end of the receiver 52 to said hook pivot 51.

The lock 54 is comprised of the shank 55 with an external thread, preferably of a Unified National form, and a bend 57 which must be formed beyond ninety degrees (90°). The purpose of the bend 57 is to engage the grab bar 48 of the compression bushing assembly 40 after the valve spring has been compressed in order to hold the apparatus 10 in the compressed-spring configuration while the user removes the valve stem keepers from the valve stem. The preferred angle of the bend 57 would be approximately one hundred twenty nine degrees (129°) in order to provide a more positive lock between the hook assembly 50 and the compression bushing assembly 40.

Figure 2:
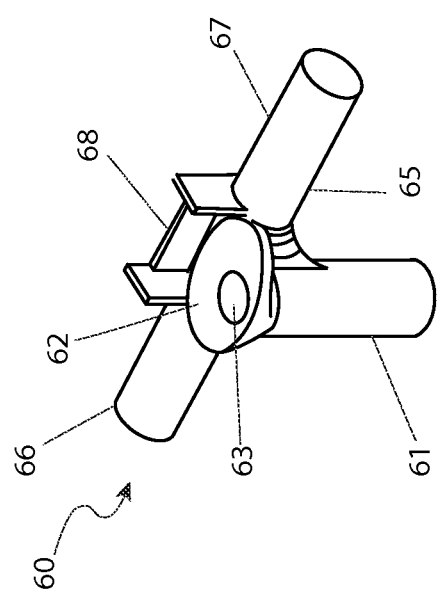
FIG. 2 is an isometric view of an inverted exhaust valve connector stem 60 of the valve spring compression tool 10 in accordance with the preferred embodiment of the present invention.

Referring now to FIG. 2, an isometric view of the inverted exhaust valve connector stem 60 of the apparatus 10, according to the preferred embodiment of the present invention, is disclosed. The exhaust valve connector stem 60 provides the fixed pivoting points which are required by the compressor 20 for the removal of the valve springs of the exhaust valves. The removal of an engine camshaft exposes threaded studs convenient to the location of the multiple exhaust valves of each cylinder of the engine. The exhaust valve connector stem 60 is comprised of an exhaust post 61 and an exhaust support bar 65. The exhaust post 61 is a tubular piece provided with an exhaust post channel 63 meant to accommodate an existing threaded stud. The exhaust support bar 65 is welded perpendicularly to the exterior of a lower portion of the exhaust post 61 with said exhaust post 61 located at the middle of said exhaust support bar 65. A first end of the exhaust support bar 65 on one (1) side of the exhaust post 61 is comprised of fulcrum A 66, while a second end of said exhaust support bar 65 on the opposite side of said exhaust post 61 is comprised of fulcrum B 67. The handle pivot bushing 31 of the compressor 20 is placed on fulcrum A 66 and the bushing 41 is positioned over the exhaust valve spring washer of the exhaust valve spring of the exhaust valve at that location. A force is exerted downwardly on the grip 35 to compress the valve spring and then the compressor 20 is locked into that configuration by engaging the bend 57 of the hook assembly 50 around the grab bar 48 of the compressor bushing assembly 40.

Disposed on the bottom of the exhaust post 61 and the exhaust support bar 65 are an exhaust post flat 62 and a plurality of exhaust stem spacers 68 which are provided to properly space the exhaust valve connector stem 60 away from certain projections of the engine cylinder head which would interfere with a perpendicular alignment of said exhaust valve connector stem 60. After the exhaust valve stem keepers have been removed, the compressor 20 can be unlocked and removed from fulcrum A 66, the exhaust valve spring can be removed and the exhaust valve stem seal can be replaced. Following the replacement of the exhaust valve stem seal, the procedure is reversed to place the exhaust valve spring back onto the exhaust valve stem; place the handle pivot bushing 31 of the compressor 20 onto fulcrum A 66; position the bushing 41 over the exhaust valve spring; exert force downwardly on the grip 35 to compress the exhaust valve spring; engage the bend 57 of the hook assembly 50 around the grab bar 48 of the compressor assembly 40 to lock the compressor 20; install the exhaust valve stem keepers; unlock the compressor 20 and remove said compressor 20 from fulcrum A 66. The procedure can then be repeated for the replacement of the next exhaust valve stem seal by moving the compressor 20 to the opposite side of the exhaust support bar 65 to utilize fulcrum B 67.

Referring now to FIG. 3, an isometric view of the inverted intake valve connector stem 70 of the apparatus 10, according to the preferred embodiment of the present invention, is disclosed. The intake valve connector stem 70 provides the fixed pivoting points which are required by the compressor 20 for the removal of the valve springs of the intake valves as seen in FIG. 4. The removal of an engine camshaft exposes threaded studs convenient to the location of the multiple intake valves of each cylinder of the engine. The intake valve connector stem 70 is comprised of an intake post 71 and an intake support bar 75. The intake post 71 is a tubular piece provided with an intake post channel 72 meant to accommodate an existing threaded stud. The intake support bar 75 is welded perpendicularly to the exterior of a lower portion of the intake post 71 with said intake post 71 located at the middle of said intake support bar 75. A first end of the intake support bar 75 on one (1) side of the intake post 71 is comprised of fulcrum C 76, while a second end of said intake support bar 75 on the opposite side of said intake post 61 is comprised of fulcrum D 77. The handle pivot bushing 31 of the compressor 20 is placed on fulcrum C 66 and the bushing 41 is positioned over the intake valve spring washer of the intake valve spring of the intake valve at that location. A force is exerted downwardly on the grip 35 to compress the valve spring and the compressor 20 is locked into that configuration by engaging the bend 57 of the hook assembly 50 around the grab bar 48 of the compressor bushing assembly 40.

Disposed on the bottom of the intake post 71, the intake support bar 75 and the reinforcing welding is a plurality of intake stem spacers 78 which are provided to properly space the intake valve connector stem 70 away from certain projections of the engine cylinder head which would interfere with a perpendicular alignment of said intake valve connector stem 70. After the intake valve stem keepers have been removed, the compressor 20 can be unlocked and removed from fulcrum C 76, the intake valve spring can be removed and the intake valve stem seal can be replaced. Following the replacement of the intake valve stem seal, the procedure is reversed to place the intake valve spring back onto the intake valve stem; place the handle pivot bushing 31 of the compressor 20 onto fulcrum C 76; position the bushing 41 over the intake valve spring; exert force downwardly on the grip 35 to compress the intake valve spring; engage the bend 57 of the hook assembly 50 around the grab bar 48 of the compressor assembly 40 to lock the compressor 20; install the intake valve stem keepers; unlock the compressor 20 and remove said compressor 20 from fulcrum C 76. The procedure can then be repeated for the replacement of the next intake valve stem seal by moving the compressor 20 to the opposite side of the exhaust support bar 75 to utilize fulcrum D 77 as seen in FIG. 4.

The preferred embodiment of the present invention can be utilized by the enabled user in a simple and straightforward manner with little or no additional training. The method of installing and utilizing the apparatus 10 may be achieved by performing the following steps: acquiring a model of the apparatus 10; following the procedure detailed by the engine manufacturer for the replacement of valve stem seals up to, and including, the removal of the cam shafts; removing the spark plug for the cylinder on which the valve stem seals are currently to be replaced; setting the piston for that cylinder at top dead center and blocking the crankshaft rotation; pressurizing the cylinder chamber to approximately thirty pounds per square inch (30 psi) with compressed air; installing the exhaust valve connector stem 60 on a threaded stud convenient to the exhaust valves; placing the handle pivot bushing 31 of the compressor 20 onto the fulcrum A 66 of the exhaust support bar 65; positioning the bushing 41 over the exhaust valve spring of the exhaust valve at that location; exerting a downward force on the grip 35 to compress the valve spring; locking the compressor 20 into that configuration by engaging the bend 57 of the hook assembly 50 around the grab bar 48 of the compressor bushing assembly 40; removing the now exposed exhaust valve spring keepers; unlocking the compressor 20 and removing said compressor 20 from the fulcrum A 66; removing the exhaust valve spring; replacing the exhaust valve stem seal; reinstalling the exhaust valve spring; placing the handle pivot bushing 31 of the compressor 20 onto the fulcrum A 66 of the exhaust support bar 65; positioning the bushing 41 over the exhaust valve spring; exerting a downward force on the grip 35 to compress the valve spring;

locking the compressor 20 into that configuration by engaging the bend 57 of the hook assembly 50 around the grab bar 48 of the compressor bushing assembly 40; replacing the exhaust valve spring keepers; unlocking the compressor 20 and removing said compressor 20 from the fulcrum A 66; placing the handle pivot bushing 31 of the compressor 20 onto the fulcrum B 67 of the exhaust support bar 65; positioning the bushing 41 over the exhaust valve spring of the exhaust valve at that location; exerting a downward force on the grip 35 to compress the valve spring; locking the compressor 20 into that configuration by engaging the bend 57 of the hook assembly 50 around the grab bar 48 of the compressor bushing assembly 40; removing the now exposed exhaust valve spring keepers; unlocking the compressor 20 and removing said compressor 20 from the fulcrum B 67; removing the exhaust valve spring; replacing the exhaust valve stem seal; reinstalling the exhaust valve spring; placing the handle pivot bushing 31 of the compressor 20 onto the fulcrum B 67 of the exhaust support bar 65; positioning the bushing 41 over the exhaust valve spring; exerting a downward force on the grip 35 to compress the valve spring; locking the compressor 20 into that configuration by engaging the bend 57 of the hook assembly 50 around the grab bar 48 of the compressor bushing assembly 40; replacing the exhaust valve spring keepers; unlocking the compressor 20 and removing said compressor 20 from the fulcrum B 67; removing the exhaust valve connector stem 60; installing the intake valve connector stem 70 on a threaded stud convenient to the intake valves of the cylinder; placing the handle pivot bushing 31 of the compressor 20 onto the fulcrum C 76 of the intake support bar 75; positioning the bushing 41 over the intake valve spring of the intake valve at that location; exerting a downward force on the grip 35 to compress the valve spring; locking the compressor 20 into that configuration by engaging the bend 57 of the hook assembly 50 around the grab bar 48 of the compressor bushing assembly 40; removing the now exposed intake valve spring keepers; unlocking the compressor 20 and removing said compressor 20 from the fulcrum C 76; removing the intake valve spring; replacing the intake valve stem seal; reinstalling the intake valve spring; placing the handle pivot bushing 31 of the compressor 20 onto the fulcrum C 76 of the intake support bar 75; positioning the bushing 41 over the intake valve spring; exerting a downward force on the grip 35 to compress the valve spring; locking the compressor 20 into that configuration by engaging the bend 57 of the hook assembly 50 around the grab bar 48 of the compressor bushing assembly 40; replacing the intake valve spring keepers; unlocking the compressor 20 and removing said compressor 20 from the fulcrum C 76; placing the handle pivot bushing 31 of the compressor 20 onto the fulcrum D 77 of the intake support bar 75; positioning the bushing 41 over the intake valve spring of the intake valve at that location; exerting a downward force on the grip 35 to compress the valve spring; locking the compressor 20 into that configuration by engaging the bend 57 of the hook assembly 50 around the grab bar 48 of the compressor bushing assembly 40; removing the now exposed intake valve spring keepers; unlocking the compressor 20 and removing said compressor 20 from the fulcrum D 77; removing the intake valve spring; replacing the intake valve stem seal; reinstalling the intake valve spring; placing the handle pivot bushing 31 of the compressor 20 onto the fulcrum D 77 of the intake support bar 75; positioning the bushing 41 over the intake valve spring; exerting a downward force on the grip 35 to compress the valve spring; locking the compressor 20 into that configuration by engaging the bend 57 of the hook assembly 50 around the grab bar 48 of the compressor bushing assembly 40; replacing the intake valve spring keepers; unlocking the compressor 20 and removing said compressor 20 from the fulcrum D 77; removing the intake valve connector stem 60; depressurizing the cylinder chamber; removing the blocking mechanism from the crankshaft; repeating the aforementioned procedure for each successive engine cylinder until all of the valve stem seals on all of the intake valves and all of the exhaust valves have been replaced; and reinstalling those pieces of the engine that were removed according to the instructed procedure of the engine manufacturer.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A valve spring compression tool, comprising:
    a compressor comprising:
        a compressor bushing assembly;
        a handle assembly having a handle pivot bushing and a hook pivot clevis; and,
        a hook assembly selectively operable to lock said tool in a compressed state and operatively connected to said handle assembly in a pivoting manner about said hook pivot clevis;
    an exhaust valve connector stem adapted to engage said handle pivot bushing; and,
    an intake valve connector stem adapted to engage said handle pivot bushing; wherein said tool is adapted to compress a valve spring of an internal combustion engine.

2. The tool of claim 1, wherein said handle assembly further comprises a compressor bushing assembly pivot wherein said compressor bushing assembly is operatively connected to said handle assembly in a pivoting manner about said compressor bushing assembly pivot.

3. The tool of claim 1, wherein said handle pivot bushing further comprises a handle pivot bushing aperture.

4. The tool of claim 3, wherein said exhaust valve connector stem comprises an exhaust post pivot and a support bar adapted to selectively engage said handle pivot bushing aperture.

5. The tool of claim 4, wherein said exhaust post pivot is adapted to fit over and be operatively secured to a projecting bolt of a cylinder head of said engine.

6. The tool of claim 3, wherein said intake valve connector stem comprises an intake post pivot and a support bar adapted to selectively engage said handle pivot bushing aperture.

7. The tool of claim 6, wherein said intake post pivot is adapted to fit over and be operatively secured to a projecting bolt of a cylinder head of said engine.

8. The tool of claim 1, wherein said compression bushing assembly further comprises a hook beam adapted to catch and retain said hook assembly when said hook assembly is selectively pivoted to lock said tool in compression.

9. A valve spring compression tool, comprising:
a compressor comprising:
- a compressor bushing assembly;
- a handle assembly comprising a handle, a handle pivot bushing a handle pivot bushing aperture, a compressor bushing assembly pivot, and a hook pivot clevis; and,
- a hook assembly selectively operable to lock said tool in a compressed state and operatively connected to said handle assembly in a pivoting manner about said hook pivot clevis;
- wherein said compressor bushing assembly is operatively connected to said handle in a pivoting manner;

an exhaust valve connector stem having an exhaust post pivot, and a first and a second exhaust fulcrum each said fulcrum adapted to engage said handle pivot bushing aperture; and, an intake valve connector stem having an intake post pivot, and a first and a second intake fulcrum each said fulcrum adapted to engage said handle pivot bushing aperture;

wherein said tool is adapted to compress a valve spring of an internal combustion engine.

10. The tool of claim 9, wherein said exhaust post pivot is adapted to fit over and be operatively secured to a projecting bolt of a cylinder head of said engine.

11. The tool of claim 9, wherein said intake post pivot is adapted to fit over and be operatively secured to a projecting bolt of a cylinder head of said engine.

12. The tool of claim 9, wherein said compression bushing assembly further comprises a hook beam adapted to catch and retain said hook assembly when said hook assembly is selectively pivoted to lock said tool in compression.

13. The tool of claim 9, wherein said handle assembly further comprises a grip disposed upon a distal end.

14. The tool of claim 13, wherein said grip further comprises a grip extension 36 adapted to lengthen said handle and provide additional leverage.

15. The tool of claim 14, wherein said grip further comprises a threaded aperture and said grip extension further comprises a threaded end such that said grip extension is threadably attached to said grip.

16. A valve spring compression tool, comprising:
a compressor comprising:
- a compressor bushing assembly, a hook assembly, a handle assembly comprising a handle, a grip, a handle pivot bushing having a handle pivot bushing aperture, a hook pivot clevis, and a compressor bushing assembly pivot wherein said compressor bushing assembly is operatively connected to said handle in a pivoting manner;

an exhaust valve connector stem having an exhaust post pivot, and a support bar adapted to selectively engage said handle pivot bushing aperture;

an intake valve connector stem having an intake post pivot, and adapted to engage said handle pivot bushing aperture;

wherein said tool is adapted to compress a valve spring of an internal combustion engine.

* * * * *